US012407286B2

United States Patent
Josyula et al.

(10) Patent No.: US 12,407,286 B2
(45) Date of Patent: Sep. 2, 2025

(54) CURRENT LIMIT STRATEGY FOR HOIST APPLICATION

(71) Applicant: Hamilton Sundstrand Corporation, Charlotte, NC (US)

(72) Inventors: Anil Prasad Josyula, Andhra Pradesh (IN); Ashish Vijay, Rajasthan (IN); Vipul Kohli, Gujarat (IN); David Frederick Brookes, Birmingham (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 117 days.

(21) Appl. No.: 18/356,334

(22) Filed: Jul. 21, 2023

(65) Prior Publication Data

US 2024/0322723 A1    Sep. 26, 2024

(30) Foreign Application Priority Data

Mar. 22, 2023 (IN) .............................. 202311020101

(51) Int. Cl.
| | |
|---|---|
| *H02H 7/09* | (2006.01) |
| *H02P 21/00* | (2016.01) |
| *H02P 21/18* | (2016.01) |
| *H02P 21/22* | (2016.01) |

(52) U.S. Cl.
CPC ............ *H02P 21/22* (2016.02); *H02P 21/001* (2013.01); *H02P 21/18* (2016.02)

(58) Field of Classification Search
CPC ......... H02P 21/22; H02P 21/18; H02P 21/001
USPC ................................................... 318/400.22
See application file for complete search history.

(56) References Cited

U.S. PATENT DOCUMENTS

| | | |
|---|---|---|
| 4,665,350 A | 5/1987 | Angi et al. |
| 6,801,009 B2 | 10/2004 | Makaran et al. |
| 6,801,909 B2 | 10/2004 | Delgado et al. |
| 6,803,735 B2 | 10/2004 | Liu et al. |
| 6,891,346 B2 | 5/2005 | Simmons et al. |

(Continued)

FOREIGN PATENT DOCUMENTS

| | | |
|---|---|---|
| CN | 102355179 A | 2/2012 |
| CN | 104155877 A | 11/2014 |

(Continued)

OTHER PUBLICATIONS

Search Report issued in European Patent Application No. 24165276.7; Application Filing Date Mar. 21, 2024; Date of Mailing Aug. 5, 2024 (7 pages).

*Primary Examiner* — Erick D Glass
(74) *Attorney, Agent, or Firm* — CANTOR COLBURN LLP

(57) ABSTRACT

A hoist application system is provided. The hoist application system includes a motor drive unit, which is receptive of a final duty command and which drives a motor in accordance with the final duty command, a closed-loop control unit configured to generate a closed-loop duty command, an open-loop control unit configured to generate an open-loop duty command and a switch logic unit. The switch logic unit is receptive of direct current (DC) system information, the closed-loop duty command and the open-loop duty command, and is configured to generate the final duty command from one of the closed-loop duty command and the open-loop duty command based on the DC system information.

15 Claims, 4 Drawing Sheets

(56) References Cited

U.S. PATENT DOCUMENTS

| | | | |
|---|---|---|---|
| 6,975,087 B1 * | 12/2005 | Crabill | G05B 11/42 |
| | | | 318/590 |
| 7,145,302 B2 | 12/2006 | Sanglikar et al. | |
| 7,321,210 B2 | 1/2008 | Wood | |
| 9,444,376 B2 | 9/2016 | Hansen et al. | |
| 10,050,574 B2 | 8/2018 | Colangelo et al. | |
| 10,074,245 B2 | 9/2018 | Jayaraman et al. | |
| 10,284,129 B2 | 5/2019 | Mir et al. | |
| 10,501,293 B2 | 12/2019 | Thirunarayana et al. | |
| 10,767,639 B2 | 9/2020 | Meissner et al. | |
| 10,870,562 B2 | 12/2020 | Thirunarayana et al. | |
| 11,239,786 B2 | 2/2022 | Murata et al. | |
| 11,764,710 B2 * | 9/2023 | Kulkarni | H02P 21/24 |
| | | | 318/400.02 |
| 2007/0115899 A1 | 5/2007 | Ovadia et al. | |
| 2010/0148710 A1 | 6/2010 | Lim et al. | |
| 2014/0084823 A1 * | 3/2014 | Lee | H02P 6/08 |
| | | | 318/400.09 |
| 2016/0056740 A1 * | 2/2016 | Nondahl | H02P 6/182 |
| | | | 318/400.11 |
| 2017/0271977 A1 * | 9/2017 | Madiwale | H02M 3/33523 |

FOREIGN PATENT DOCUMENTS

| | | |
|---|---|---|
| CN | 110963380 A | 4/2020 |
| WO | 2015179364 A2 | 11/2015 |

* cited by examiner

CURRENT LIMIT STRATEGY FOR HOIST APPLICATION

CROSS-REFERENCE TO RELATED APPLICATIONS

This application claims the benefit of Indian Application No. 202311020101 filed Mar. 22, 2023, the disclosure of which is incorporated herein by reference in its entirety.

BACKGROUND

The present disclosure relates to a hoist application and, in particular, to a current limit strategy for a hoist application.

Helicopter-hoist equipment typically includes a lifting device such as a hoist, which is attached to a helicopter, a hoist cable and a hook located at the distal end of the cable for direct or indirect attachment to a person, animal or object for rescue. The hoist usually has a rotary drum and a motor. The motor turns the rotary drum for winding the cable in and out to lift or transport a load.

A need remains for improved current control in a motor of helicopter-hoist equipment.

SUMMARY

According to an aspect of the disclosure, a hoist application system is provided. The hoist application system includes a motor drive unit, which is receptive of a final duty command and which drives a motor in accordance with the final duty command, a closed-loop control unit configured to generate a closed-loop duty command, an open-loop control unit configured to generate an open-loop duty command and a switch logic unit. The switch logic unit is receptive of direct current (DC) system information, the closed-loop duty command and the open-loop duty command, and is configured to generate the final duty command from one of the closed-loop duty command and the open-loop duty command based on the DC system information.

In accordance with additional or alternative embodiments, the closed-loop control unit is configured to calculate the closed-loop duty command based on an error between a commanded motor speed and a measured motor speed.

In accordance with additional or alternative embodiments, the open-loop control unit is configured to calculate the open-loop duty command using a fuzzy map algorithm.

In accordance with additional or alternative embodiments, the fuzzy map algorithm considers a measured motor speed, the DC system information and a current version of the final duty command.

In accordance with additional or alternative embodiments, the open-loop control unit is configured to calculate the open-loop duty command to achieve a gradual time-based duty cycle reduction.

In accordance with additional or alternative embodiments, the switch logic unit is configured to transition from the closed-loop duty command to the open-loop duty command by comparing a DC-link current to a threshold value from the DC system information and transitioning from the closed-loop duty command to the open-loop duty command in an event the DC-link current exceeds the threshold value for a predetermine time.

In accordance with additional or alternative embodiments, the threshold value is about 150 A.

In accordance with additional or alternative embodiments, the switch logic unit is configured to transition from the open-loop duty command to the closed-loop duty command in an event the DC system information indicates that a DC-link current is lower than a threshold value for a predetermined time and closed-loop operation is possible without crossing the threshold value.

In accordance with additional or alternative embodiments, the threshold value is about 150 A.

According to an aspect of the disclosure, a method of operating a hoist application system is provided and includes driving a motor in accordance with a final duty command, generating, in a closed-loop control unit, a closed-loop duty command, generating, in an open-loop control unit, an open-loop duty command and generating the final duty command from one of the closed-loop duty command and the open-loop duty command based on direct current (DC) system information.

In accordance with additional or alternative embodiments, the generating of the closed-loop duty command includes calculating the closed-loop duty command based on an error between a commanded motor speed and a measured motor speed.

In accordance with additional or alternative embodiments, the generating of the open-loop duty command includes calculating the open-loop duty command using a fuzzy map algorithm.

In accordance with additional or alternative embodiments, the fuzzy map algorithm considers a measured motor speed, the DC system information and a current version of the final duty command.

In accordance with additional or alternative embodiments, the generating of the open-loop duty command includes calculating the open-loop duty command to achieve a gradual time-based duty cycle reduction.

In accordance with additional or alternative embodiments, the generating of the final duty command includes switching from the closed-loop duty command to the open-loop duty command and the switching includes comparing a DC-link current to a threshold value from the DC system information and transitioning from the closed-loop duty command to the open-loop duty command in an event the DC-link current exceeds the threshold value for a predetermine time.

In accordance with additional or alternative embodiments, the threshold value is about 150 A.

In accordance with additional or alternative embodiments, the generating of the final duty command includes switching from the open-loop duty command to the closed-loop duty command and the switching includes determining whether the DC system information indicates that a DC-link current is lower than a threshold value for a predetermined time and a closed-loop operation is possible without crossing the threshold value and switching from the open-loop duty command to the closed-loop duty command in an event the DC system information indicates that the DC-link current is lower than the threshold value for the predetermined time and, for a commanded motor speed and a load applied on the system, the closed-loop operation is possible without crossing the threshold value.

In accordance with additional or alternative embodiments, the threshold value is about 150 A.

According to an aspect of the disclosure, a method of operating a hoist application system is provided and includes driving a motor in accordance with a final duty command, generating, in a closed-loop control unit, a closed-loop duty command, generating, in an open-loop control unit, an open-loop duty command and generating the final duty command from one of the closed-loop duty command and the open-loop duty command based on direct current (DC)

system information. The generating of the final duty command includes one of switching from the closed-loop duty command to the open-loop duty command and switching from the open-loop duty command to the closed-loop duty command.

In accordance with additional or alternative embodiments, the switching from the closed-loop duty command to the open-loop duty command includes comparing a DC-link current to a threshold value from the DC system information and transitioning from the closed-loop duty command to the open-loop duty command in an event the DC-link current exceeds the threshold value for a predetermine time and the switching from the open-loop duty command to the closed-loop duty command includes determining whether the DC system information indicates that a DC-link current is lower than a threshold value for a predetermined time and a closed-loop operation is possible without crossing the threshold value and switching from the open-loop duty command to the closed-loop duty command in an event the DC system information indicates that the DC-link current is lower than the threshold value for the predetermined time and, for a commanded motor speed and a load applied on the system, the closed-loop operation is possible without crossing the threshold value.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

For specific applications of a brushless direct current (DC) or BLDC motor, such as in a hoist application for a helicopter, there is often a desire to control hoisting speed without a current loop. In these cases, a challenge exists in that monitoring and limiting DC-link current becomes necessary. Indeed, for certain BLDC motors with very low inductance, it can be difficult to control the input current. Moreover, in certain low-cost drive systems, there may not be three-phase current sensors available.

Thus, as will be described below, a hoist application system is provided in which the DC-Link current is monitored and limited by taking a penalty on the speed of the motor in case of high loads. Typically, a hysteresis controller for the DC-link current can be used, but this will result in speed oscillations if it is not implemented with a high accuracy sensor or with a reduced latency system. To avoid this issue, a logical architecture is configured to smoothly transition from closed-loop speed control to an open-loop duty cycle-based motor drive system and vice versa. In the open-loop system, a calculated duty cycle is applied to limit the DC-link current based on speed and current feedback.

Figure 1:
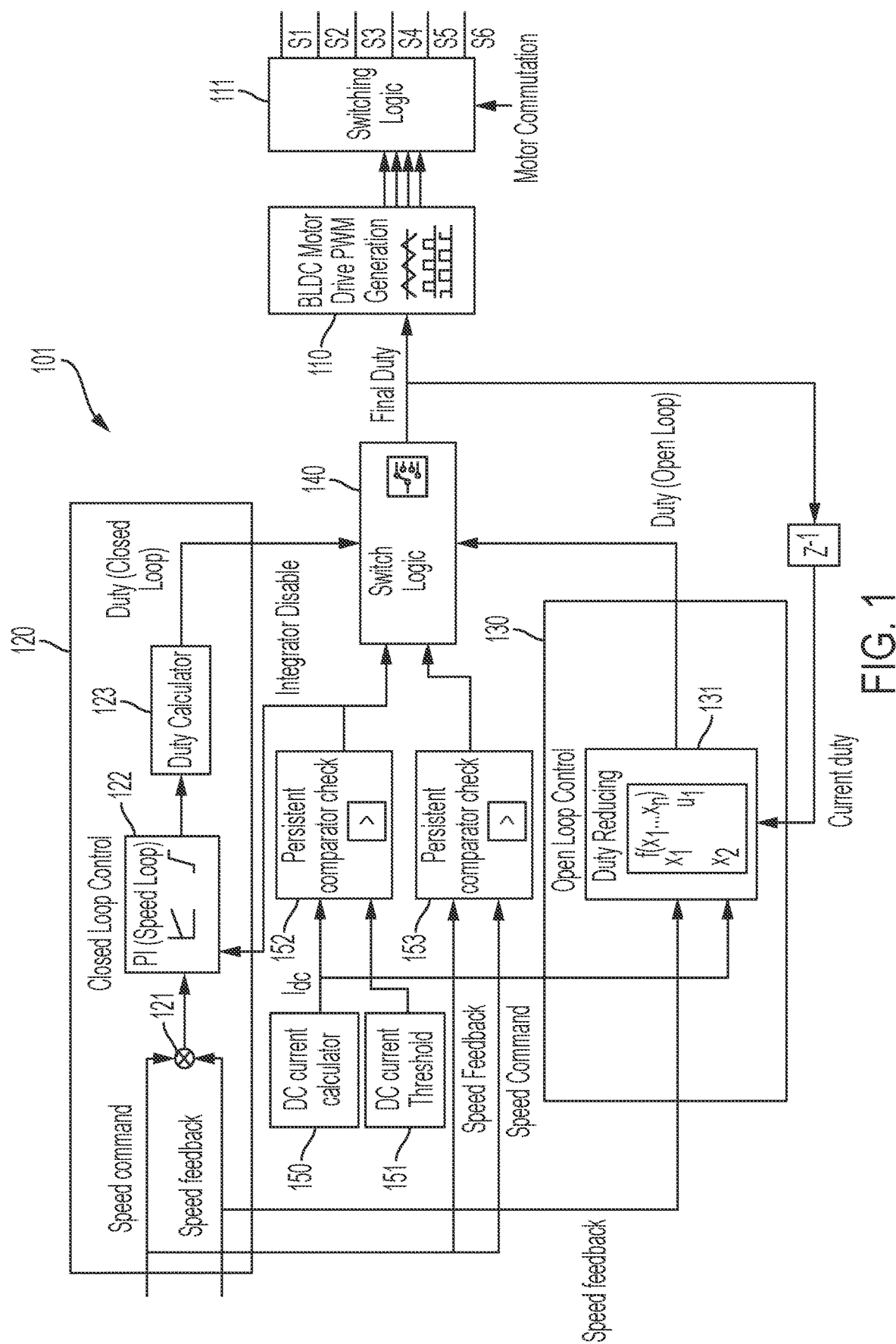
FIG. 1 is a schematic diagram illustrating a hoist application system in accordance with embodiments.

With reference to FIG. 1, a hoist application system 101 is provided and includes a motor drive unit 110, which is receptive of a final duty command and which drives a motor via switching logic 111 in accordance with the final duty command. The motor can be a BLDC motor and the motor drive unit 110 can be provided as a pulse width modulation (PWM) generation unit. The hoist application system 101 further includes a closed-loop control unit 120 that is configured to generate a closed-loop duty command, an open-loop control unit 130 that is configured to generate an open-loop duty command and a switch logic unit 140. The switch logic unit 140 is receptive of direct current (DC) system information, the closed-loop duty command from the closed-loop control unit 120 and the open-loop duty command from the open-loop control unit 130. The switch logic unit 140 is configured to generate the final duty command from one of the closed-loop duty command and the open-loop duty command based on the DC system information.

In addition, the hoist application system 101 also includes a DC current calculator 150, which is configured to calculate DC-link current and to output a signal accordingly, a DC current threshold unit 151 that stores a predetermined threshold value of a DC current limit (i.e., about 150 A) and a first comparator 152. The first comparator 152 is configured to compare the DC-link current and the predetermined threshold value, which together form the DC system information, to determine whether the DC-link current is currently above or below the predetermined threshold value and to issue a signal to the switch logic unit 140 accordingly. The hoist application system 101 still further includes a second comparator 153, which is receptive of a motor speed command signal (i.e., a commanded motor speed) and a motor speed feedback signal (i.e., a measured motor speed). The second comparator 153 is configured to compare the commanded motor speed and the measured motor speed, the determine which is larger and to issue a signal to the switch logic unit 140 accordingly.

The closed-loop control unit 120 includes a summation unit 121, which is receptive of the motor speed command signal (i.e., the commanded motor speed) and the motor speed feedback signal (i.e., the measured motor speed), and which is configured to generate an error signal that is representative of the error between the commanded motor speed and the measured motor speed. The closed-loop control unit 120 further includes a proportional integral (PI) controller 122, which is receptive of the error signal that it converts to a PI voltage command signal, and a duty calculator 123. The duty calculator 123 is receptive of the PI voltage command signal and thus calculates the closed-loop duty command. Thus, the closed-loop duty command is calculated based at least partially on the error between a commanded motor speed and a measured motor speed. The PI controller 122 can be disabled by the switch logic unit 140 in a case in which the switch logic unit 140 generates the final duty command from the open-loop duty command.

The open-loop control unit 130 includes a duty reducing unit 131, which is receptive of a current version of the final duty command, the motor speed feedback signal and the DC-link current. The open-loop control unit 130 is thus configured to calculate the open-loop duty command using a fuzzy map algorithm, which considers a measured motor speed from the motor speed feedback signal, the DC-link current from the DC system information and the current version of the final duty command. Alternatively, the open-loop control unit 130 can be configured to calculate the open-loop duty command to achieve a gradual time-based duty cycle reduction.

With the hoist application system 101 configured as described above, the switch logic unit 140 is configured to transition from the closed-loop duty command to the open-loop duty command by comparing or recognizing the comparison of the first comparator 152 of the DC-link current to the predetermined threshold value (i.e., about 150 A) and transitioning from the closed-loop duty command to the open-loop duty command in an event the DC-link current exceeds the predetermined threshold value for a predetermine time. Conversely, the switch logic unit 140 is configured to transition from the open-loop duty command to the closed-loop duty command in an event the comparison of the first and second comparators 152 and 153 indicate that the DC-link current is lower than the predetermined threshold value for a predetermined time and it is estimated whether, for the commanded motor speed and a load applied on the system, a closed-loop operation is possible without crossing the predetermined threshold value for the DC-link current. Based on an output of this estimation, the hoist application system 101 can transition to the closed-loop operation smoothly. In accordance with embodiments, the estimation can be carried out at a relatively slow rate so as to avoid unwanted switching between open-loop control to closed-loop control, which can result in system oscillation.

Figure 2:
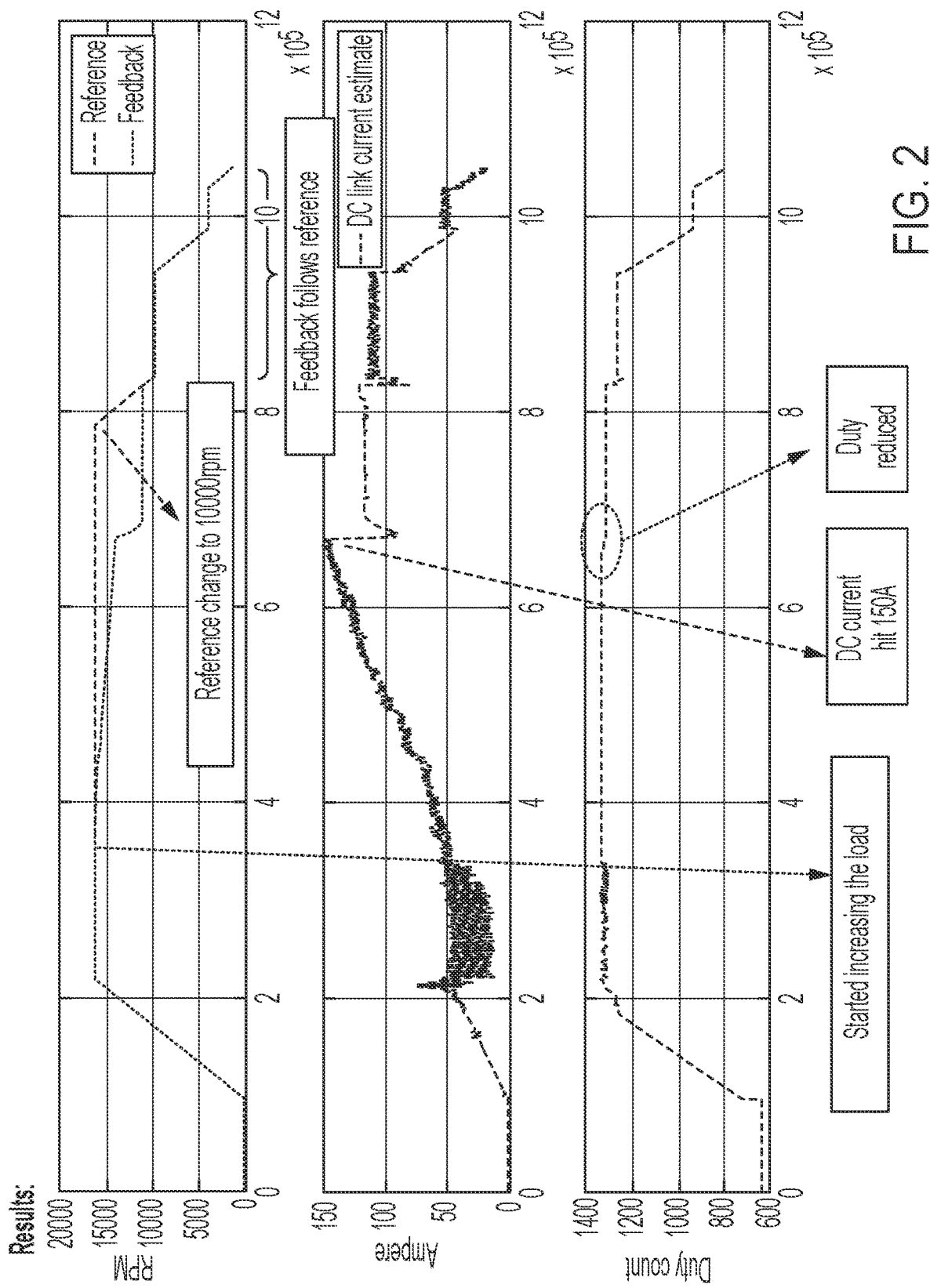
FIG. 2 is a graphical illustrating of an execution of the hoist application system of FIG. 1 in accordance with embodiments.

An operation of the hoist application system 101 is illustrated in FIG. 2. As shown in FIG. 2, a commanded motor speed can be set at 16,500 rpm. In this case, the motor is driven by the closed-loop duty command to 16,500 rpm, at which time a load on the motor is increased. This load increase continues until DC current reaches 150 A. At this point, the open-loop duty command is used to drive the motor with the commanded (or reference) speed dropped to 10,000 rpm and then to 4,000 rpm without load reduction. During the use of the open-loop duty command, it is observed that the measured motor speed more closely follows the commanded motor speed than in the moments following the load increase and until the transition to the open-loop control.

Figure 3:
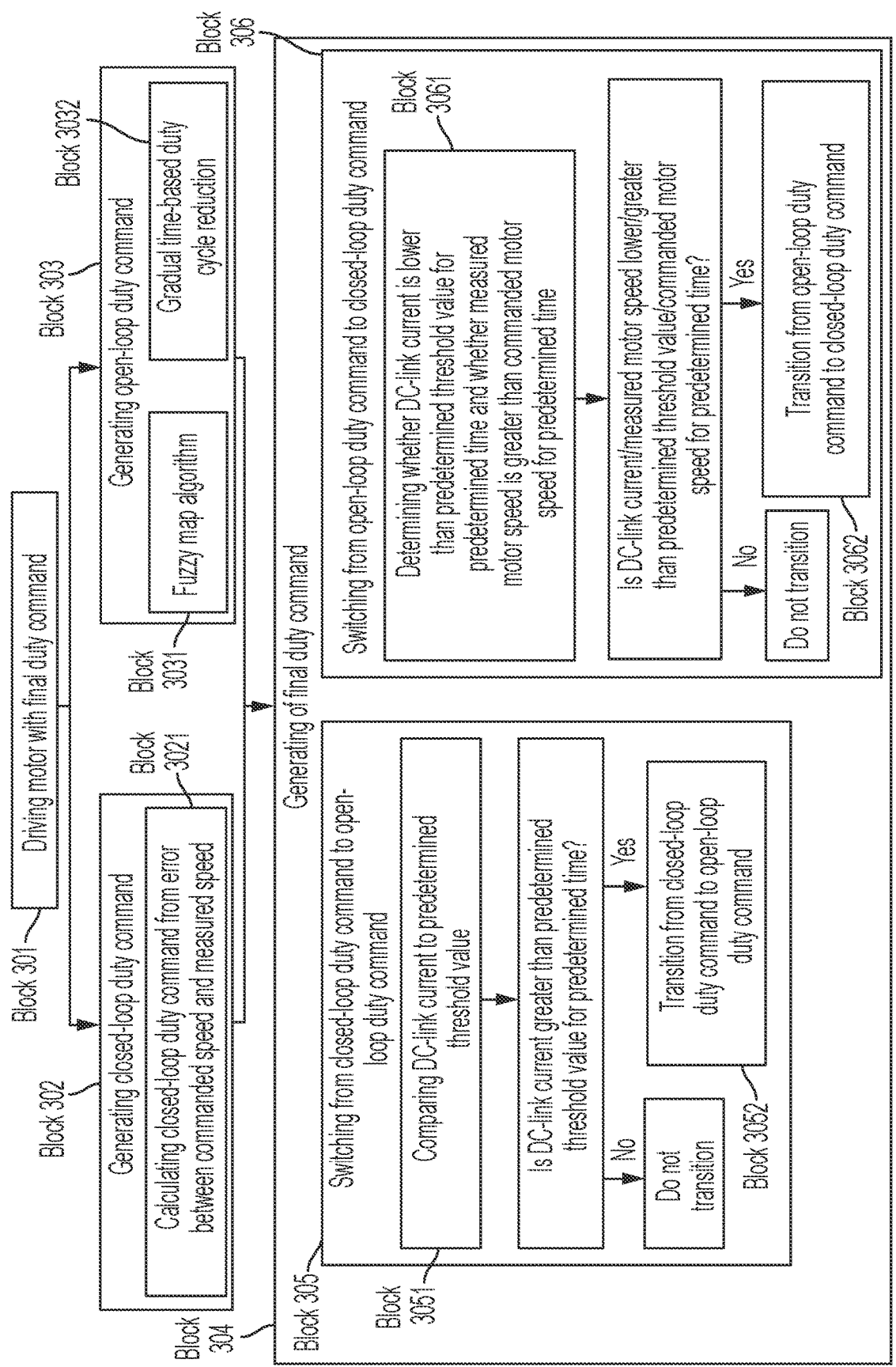
FIG. 3 is a flow diagram illustrating a method of operating the hoist application system of FIG. 1 in accordance with embodiments.
Figure 4:
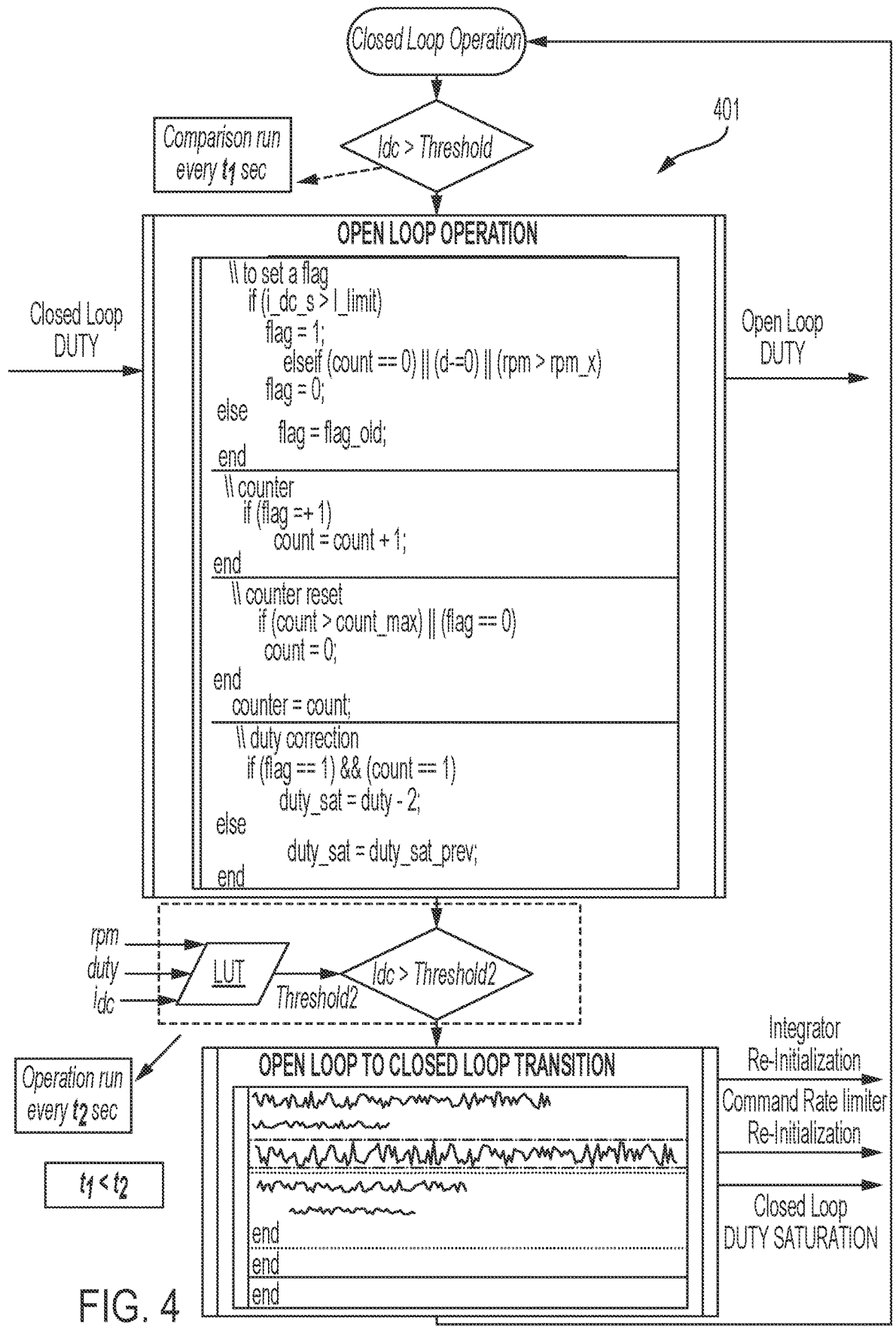
FIG. 4 is a state diagram illustrating a hoist application system operation in accordance with embodiments.

With reference to FIGS. 3 and 4, a method 300 (see FIG. 3) of operating a hoist application system, such as the hoist application system 101 of FIG. 1, is provided. The method 300 includes driving a motor in accordance with a final duty command (block 301), generating, in a closed-loop control unit, a closed-loop duty command (block 302) by calculating the closed-loop duty command based on the error between the commanded motor speed and the measured motor speed (block 3021), generating, in an open-loop control unit, an open-loop duty command (block 303) and generating the final duty command from one of the closed-loop duty command and the open-loop duty command based on DC system information (block 304). The generating of the open-loop duty command of block 303 can be executed using a fuzzy map algorithm as described above (block 3031) or to achieve a gradual time-based duty cycle reduction (block 3032).

The generating of the final duty command of block 304 can includes switching from the closed-loop duty command to the open-loop duty command (block 305) or switching from the open-loop duty command to the closed-loop duty command (block 306). The switching from the closed-loop duty command to the open-loop duty command of block 305 includes comparing the DC-link current to the predetermined threshold value (i.e., about 150 A) from the DC system information (block 3051) and transitioning from the closed-loop duty command to the open-loop duty command in an event the DC-link current exceeds the predetermined threshold value for the predetermine time (block 3052).

The switching from the open-loop duty command to the closed-loop duty command of block 306 can include determining whether the DC system information indicates that the DC-link current is lower than the predetermined threshold value for the predetermined time and estimating whether, for the commanded motor speed and a load applied on the system, a closed-loop operation is possible without crossing the predetermined threshold value for the DC-link current (block 3061). In accordance with embodiments, the estimation can be carried out at a relatively slow rate to avoid unwanted switching between open-loop control to closed-loop control, which can result in system oscillation and, based on an output of this estimation, the hoist application system 101 can transition to the closed-loop operation smoothly. That is, the switching from the open-loop duty command to the closed-loop duty command of block 306 can further include switching or transitioning from the open-loop duty command to the closed-loop duty command in an event the DC system information indicates that the DC-link current is lower than the predetermined threshold value for the DC-link current for the predetermined time and, for the commanded motor speed and a load applied on the system, it is estimated that the closed-loop operation is possible without crossing the predetermined threshold value for the DC-link current (block 3062).

As shown in FIG. 4, a state diagram 401 illustrating a hoist application system operation is provided. The state diagram begins with closed-loop operation as described above. During the closed-loop operation, it is determined whether the DC current exceeds a threshold. If so, open-loop operation can be initiated as described above with the closed-loop duty cycle provided as an input and the open-loop duty cycle given as the output. During the open-loop operation, it is determined whether to return to closed-loop operation as explained above, or continue with the open-loop operation.

Technical effects and benefits of the present disclosure are the provision of a hoist application system that is low cost and has a relatively simple control algorithm.

The corresponding structures, materials, acts, and equivalents of all means or step-plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A hoist application system, comprising:
a motor drive unit, which is receptive of a final duty command and which drives a motor in accordance with the final duty command;
a closed-loop control unit configured to generate a closed-loop duty command;
an open-loop control unit configured to generate an open-loop duty command; and
a switch logic unit, which is receptive of direct current (DC) system information, the closed-loop duty command and the open-loop duty command, and which is configured to generate the final duty command from one of the closed-loop duty command and the open-loop duty command based on the DC system information,
wherein:
the switch logic unit transitions from the closed-loop duty command to the open-loop duty command when a DC-link current exceeds a threshold value from the DC system for a predetermined time, and
the switch logic unit transitions from the open-loop duty command to the closed-loop duty command when the DC-link current is lower than the threshold value for the predetermined time and closed-loop operation is possible without crossing the threshold value.

2. The hoist application system according to claim 1, wherein the closed-loop control unit is configured to calculate the closed-loop duty command based on an error between a commanded motor speed and a measured motor speed.

3. The hoist application system according to claim 1, wherein the open-loop control unit is configured to calculate the open-loop duty command using a fuzzy map algorithm.

4. The hoist application system according to claim 3, wherein the fuzzy map algorithm considers a measured motor speed, the DC system information and a current version of the final duty command.

5. The hoist application system according to claim 1, wherein the open-loop control unit is configured to calculate the open-loop duty command to achieve a gradual time-based duty cycle reduction.

6. The hoist application system according to claim 1, wherein the threshold value is about 150 A.

7. The hoist application system according to claim 1, wherein the threshold value is 150 A.

8. A method of operating a hoist application system, the method comprising:
driving a motor in accordance with a final duty command;
generating, in a closed-loop control unit, a closed-loop duty command;
generating, in an open-loop control unit, an open-loop duty command; and
generating the final duty command from one of the closed-loop duty command and the open-loop duty command based on direct current (DC) system information,
wherein the generating of the final duty command comprises:
transitioning from the closed-loop duty command to the open-loop duty command when a DC-link current exceeds a threshold value from the DC system information for a predetermined time; and
transitioning from the open-loop duty command to the closed-loop duty command when the DC-link current is lower than the threshold value for the predetermined time and, for a commanded motor speed and a load applied on the system, the closed-loop operation is possible without crossing the threshold value.

9. The method according to claim 8, wherein the generating of the closed-loop duty command comprises calculating the closed-loop duty command based on an error between a commanded motor speed and a measured motor speed.

10. The method according to claim 8, wherein the generating of the open-loop duty command comprises calculating the open-loop duty command using a fuzzy map algorithm.

11. The method according to claim 10, wherein the fuzzy map algorithm considers a measured motor speed, the DC system information and a current version of the final duty command.

12. The method according to claim 8, wherein the generating of the open-loop duty command comprises calculating the open-loop duty command to achieve a gradual time-based duty cycle reduction.

13. The method according to claim 8, wherein the threshold value is about 150 A.

14. The method according to claim 8, wherein the threshold value is 150 A.

15. A method of operating a hoist application system, the method comprising:
driving a motor in accordance with a final duty command;
generating, in a closed-loop control unit, a closed-loop duty command;
generating, in an open-loop control unit, an open-loop duty command; and
generating the final duty command from one of the closed-loop duty command and the open-loop duty command based on direct current (DC) system information,
wherein the generating of the final duty command comprises one of switching from the closed-loop duty command to the open-loop duty command and switching from the open-loop duty command to the closed-loop duty command,
wherein:
the switching from the closed-loop duty command to the open-loop duty command comprises comparing a DC-link current to a threshold value from the DC system information and transitioning from the closed-loop duty command to the open-loop duty command in an event the DC-link current exceeds the threshold value for a predetermine time, and
the switching from the open-loop duty command to the closed-loop duty command comprises determining whether the DC system information indicates that a DC-link current is lower than a threshold value for a predetermined time and a closed-loop operation is possible without crossing the threshold value and switching from the open-loop duty command to the closed-loop duty command in an event the DC system information indicates that the DC-link current is lower than the threshold value for the predetermined time and, for a commanded motor speed and a load applied on the system, the closed-loop operation is possible without crossing the threshold value.

* * * * *